United States Patent [19]

Primiano

[11] 4,157,468

[45] Jun. 5, 1979

[54] METHOD AND APPARATUS FOR COUNTING PARTICLES OF PARTICULATE MATERIAL

[75] Inventor: Michael P. Primiano, Lake Oswego, Oreg.

[73] Assignees: Ronald R. Olson; Kathleen R. Olson, both of Madras, Oreg.

[21] Appl. No.: 805,413

[22] Filed: Jun. 10, 1977

[51] Int. Cl.[2] .......... G01D 21/04

[52] U.S. Cl. .......... 250/223 R; 250/221; 250/222 PC

[58] Field of Search .......... 250/209, 221, 222 PC, 250/223 R

[56] References Cited

U.S. PATENT DOCUMENTS 3,365,699 1/1968 Foster .......... 250/223 R 3,537,091 10/1970 Schenkenberg .......... 250/223 R

*Primary Examiner*—M. Tokar

*Attorney, Agent, or Firm*—Oliver D. Olson

[57] ABSTRACT

Infrared or visible light radiation is arranged to traverse substantially the entire cross sectional area of a passageway as a wide, flat beam having a thickness not substantially exceeding the minimum thickness of particles to be counted and a width substantially greater than the thickness, and is detected as a field of radiation of substantially constant intensity. When a particle falls by gravity through any portion of the field, the detected change in intensity functions to activate an electronic counter which provides a direct digital readout of the number of particles passing through the field in a given period of time, distance, or area.

8 Claims, 5 Drawing Figures

METHOD AND APPARATUS FOR COUNTING PARTICLES OF PARTICULATE MATERIAL

BACKGROUND OF THE INVENTION

This invention relates to the counting of particles, and more particularly to method and apparatus for counting seeds as they are delivered from a seed planter to the soil.

In practice, a plurality of separate seed planters are drawn over the ground by a tractor, the planters being spaced apart laterally according to the desired spacing between plant rows. Each planter is supplied with seeds from its own reservoir and each delivers its seeds to the soil independently of the others.

In the planting of seeds it is important that all of the planters deliver seeds the same feed rate. It is also important to be able to ascertain when any given planter is failing to deliver seeds to the soil, as when the supply reservoir becomes empty, or the seed delivery mechanism becomes plugged or inoperative, or because of some other malfunction of the planter.

Seed monitors and counters have been provided heretofore in an effort to achieve the foregoing objectives. One such type of monitor and counter functions by dropping seeds by gravity onto a spring loaded, pivoted plate which thereupon is pivoted to effect closure of the contacts of a switch in an electric counting circuit. This type of monitor is restricted in use to the counting of seeds of sufficient weight as to effect pivoting of the plate sufficiently to operate the switch. Moreover, it is susceptible of significant errors in counting, since the plate is caused to pivot under the influence of jars and jolts as the seed planting equipment travels over the uneven terrain of the planting area. Thus, it can falsely give indication that seeds are being planted even though no seeds are being delivered to the soil.

Another type of seed monitor and counter functions by dropping seeds by gravity vertically downward through a tube across which is provided a single horizontal beam of light, and detecting the resulting decrease of light intensity by a photocell. The beam of light has a vertical thickness many times greater than the thickness of seeds to be counted, and the photocell has a correspondingly large vertical field of detection. Accordingly, this type of seed counter is incapable of counting a large variety of types of seeds with sufficient accuracy to be of practicable utility. Indeed, its use is limited to the counting of seeds of a predetermined narrow range of sizes, because a plurality of seeds of smaller size can pass through the beam simultaneously and only be counted as one seed, and seeds of larger size cannot pass through the tube since the tube is restricted in width to the width of the single light beam.

SUMMARY OF THE INVENTION

In its basic concept, this invention involves the provision of a flat beam of infrared or visible light radiation transversely across a vertical passageway through which particles to be counted are dropped by gravity, the beam having a vertical thickness not substantially exceeding the minimum thickness of the particles to be counted and a horizontal expanse substantially greater than the thickness of the beam, and detecting the change in intensity of the radiation resulting from the passage of a particle through any portion of the beam.

It is by virtue of the foregoing basic concept that the principal objective of this invention is achieved; namely, to overcome the aforementioned disadvantages and limitations of prior seed monitors and counters.

Another important objective of this invention is the provision of method and apparatus by which to achieve accurate counting of particles of a wide range of sizes and feed rates.

Still another important object of this invention is the provision of seed counting apparatus which is capable of incorporation into conventional seed planting equipment with speed and facility and with minimum modification of such equipment.

A further important objective of this invention is the provision of seed counting apparatus which is capable of counting with speed and precision seeds ranging in size from celery to chunks of potato.

A still further important object of this invention is the provision of particle counting apparatus which is of simplified construction for economical manufacture.

The foregoing and other objects and advantages of this invention will appear from the following detailed description, taken in connection with the accompanying drawings of a preferred embodiments.

DESCRIPTION OF THE PREFERRED EMBODIMENT

Figure 1:
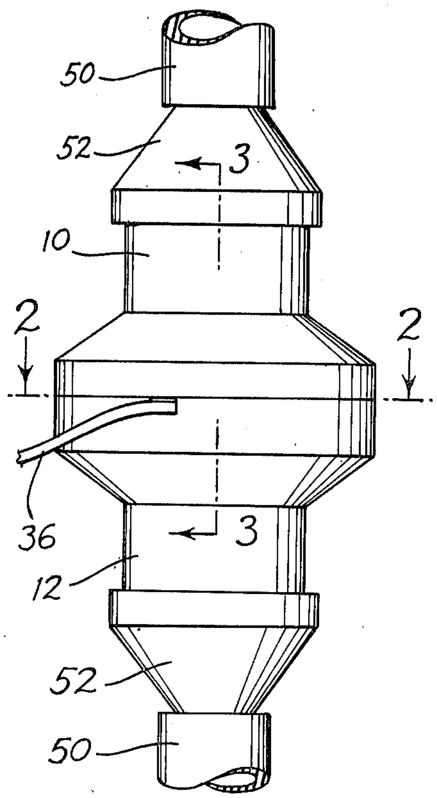
FIG. 1 is a fragmentary vertical elevation of particle counting apparatus embodying the features of this invention, the same being shown interposed between sections of an outfeed delivery tube of a seed planting implement.

The apparatus comprises a particle sensing unit and a particle counting unit. The sensing unit includes a hollow body which provides a longitudinal passageway through which particles to be counted fall by gravity. In the embodiment illustrated, the hollow body is formed of two longitudinal tubular sections 10 and 12 each having an inner wall 14 defining a longitudinal portion of a passageway.

A ring-shaped support member 16 is interposed between the spaced, inwardly confronting ends of the body sections. Mating grooves are provided in the ring member and adjacent ends of the body sections for securing the ring member against lateral displacement relative to the body sections.

The inner wall 18 defining the central opening in the ring member is dimensioned to align with the inner walls 14 defining portions of the passageway in the body sections. In this manner a continuous passageway of uniform cross sectional dimension is provided through the entire hollow body. The smooth, uniform, uninterrupted surfaces 14, 18 of the passageway thus insures unobstructed passage of the particles through the passageway, without deflections or other impediments to their passage.

Although this invention may be utilized for the counting of a wide variety of discrete objects and particles, it has particular utility in monitoring and counting seeds while they are being delivered from seed planting equipment to the ground. Accordingly, this invention is described hereinafter with reference to this use.

The ring member 16 provides support for components of a source and detection of radiation. In the preferred embodiment illustrated, an outward projection 20 on the ring member is provided with a stepped bore, disposed tangent to the passageway. The larger diameter portion of the bore is arranged to retain frictionally therein the housing of a source 22 of infrared or visible light. It is preferred that the source be of infrared radiation, since the latter functions effectively to sense the passage of particles to be counted even in the dusty atmosphere prevailing during the operation of seed planting equipment.

The infrared radiation from the diode 22 is conducted to the passageway defined by wall 18 by means which is capable of providing transversely across the passageway a flat beam of radiation having a vertical thickness not substantially exceeding the minimum thickness of particles to be counted and a width substantially greater than its thickness. In the embodiment illustrated, this means comprises a multiplicity of optical fibers 24. Typical of such fiber optic material is Crofon manufactured by E. I. Du Pont de Nemours & Co. Materials of this type are found to project a beam of radiation the diameter of which is substantially the same as the diameter of the fiber and which diameter of the beam remains substantially the same entirely across the passageway. In this regard, the divergence of the beam from the end of the fiber increases approximately 0.3% per centimeter. Thus, assuming the diameter of the passageway is 2.5 centimeters, the divergence of the beam across the diameter is about 0.8%. With an optical fiber having a diameter of about 0.75 mm., the diameter of the beam after traversing the passageway is about 0.8 mm. Thus, for all practical purposes the diameter of the beam can be considered as being the same entirely across the passageway.

It will be appreciated that since the diameter of the beam is about 0.75 mm. across the full extent of the passageway, the minimum size of particle capable of being counted with precision, is about 0.75 mm. since smaller particles may pass through the vertical dimension of the beam simultaneously and yet be counted only as one particle.

In order to insure accurate counting of particles not substantially smaller than the vertical thickness of the beam, the lateral spacing between adjacent optical fibers must be slightly less than the vertical thickness of the beam, so as to insure against minimum size particles passing undetected between adjacent beams. Thus, in the foregoing illustration wherein the optical fibers have diameters of about 0.75 mm., the lateral spacing between adjacent fibers should be less than 0.75 mm.

Under the foregoing conditions, therefore, the multiplicity of beams emanating from the multiplicity of optical fibers 24 form a substantially continuous, wide, flat beam of radiation traversing substantially the entire cross sectional area of the passageway, forming a field of substantially constant density.

As illustrated, the inner end portions of the multiplicity of optical fibers 24 are secured in openings formed transversely through a medial transverse plane of the ring 16. They are retained in position by frictional engagement with the walls of the openings. It will be understood, of course, that the ring is constructed of opaque or other material not exhibiting the optical properties of the fibers.

On the side of the ring 16 opposite the radiating fibers 24, means is provided for detecting the radiation emitted from the fibers. In the embodiment illustrated, the detector means comprises a silicon photo-transistor 26 mounted in a tangential bore in a second lateral projection 28 on the ring. A multiplicity of optical fibers 30, similar to the fibers 24 described hereinbefore, are mounted at one of their ends in laterally spaced bores in the ring for communication at said end with the passageway diametrically opposite the fibers 24 communicating with the radiation source 22. The opposite end of the fibers are retained in a bore in the lateral projection 28, for registration of their ends with the phototransistor.

The ends of the optical fibers 30 facing the passageway are disposed in the same transverse plane as the confronting ends of the fibers 24 associated with the radiation source 22. Preferably, the cross sectional size and the lateral spacing between the fibers are the same as the arrangement previously described.

A source of electric potential for the infrared emitting diode 22, and an electronic counting circuit associated with the phototransistor 26, preferably are located remotely from the particle sensing unit described hereinbefore. For example, when the sensing unit is utilized to count seeds as they are delivered from a seed planter to the soil, the power source and counter unit preferably are located in a housing mounted on the pulling tractor. Since the electronic counter preferably includes a direct digital readout system, the housing is mounted on the tractor in a position for convenient viewing of the readout display by the tractor operator.

To facilitate connection of the infrared emitting diode 22 with its source of electric potential and the phototransistor 26 to its electronic counting circuit, an annular plate 32 of dielectric material is provided with appropriate circuitry, in the form of printed circuitry, on one or both of its faces. Thus, the electrical conductors 34 leading from the infrared emitting diode 22 are connected conductively to printed circuitry on the plate 32, and said printed circuitry is connected to electrical conductors in the cable 36 which leads to a power supply on the tractor. Similarly, the electrical conductors 38 leading from the phototransistor 26 are connected to amplifier, shaper and impedance matching circuitry mounted on the printed circuit plate 32, from which electrical conductors extend through the cable 36 to an electronic counter circuit in the housing on the tractor. Typical circuitry is described hereinafter.

In the embodiment illustrated, the outwardly projecting portions of the support ring 16 and printed circuit plate 32, together with the components associated therewith, are protected against the weather and other contamination, by confinement in an annular space 40 defined by peripheral walls 42 and 44 projecting outwardly from the longitudinal tube sections 10 and 12, respectively. Each of these outer walls is secured to the associated tube section intermediate the ends of the latter and terminate in interengaging outer edges, whereby to seal the annular space inwardly thereof. These mating edges may be secured together by a sealant, or by other means which serves to integrate the longitudinal tube sections 10 and 12 and supporting ring 16 into a one-piece structure.

As illustrated, a notch 46 in the plate 32 registers with an index projection 48 on the inner side of wall 44 to secure the plate 32 and ring 16 against rotational displacement from a predetermined alignment.

The hollow body is positioned vertically for receiving through its upper end the particles to be counted and for delivering from its lower end the counter particles for subsequent processing. In the application to the counting of seeds as they are being planted, FIG. 1 illustrates the incorporation of the sensing unit into the delivery tube 50 of a seed planter by cutting the delivery tube intermediate its ends and interposing the sensing unit. As illustrated, the delivery tube is somewhat smaller in diameter than the passageway. Accordingly, a hollow reducer 52 is utilized at each end of the hollow body for coupling the severed ends of the seed delivery tube to the top and bottom ends of the sensing unit. The reducers may be secured to the opposite ends of the body by interengaging screw threads by adhesive, or any other conventional means.

Figure 4:
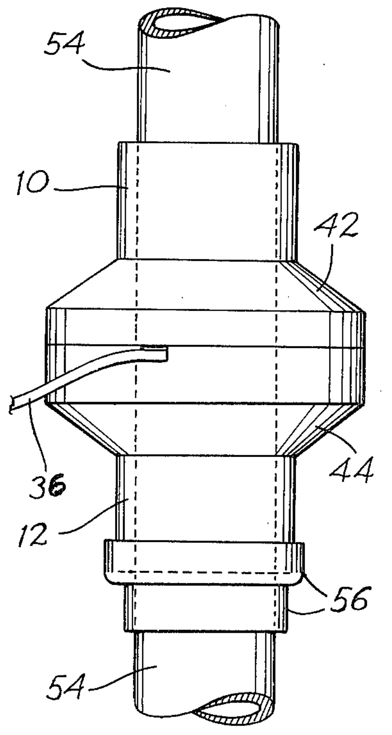
FIG. 4 is a fragmentary vertical elevation showing the particle counting apparatus of FIGS. 1-3 mounted upon a transparent outfeed tube of a conventional seed planting implement.

FIG. 4 illustrates the sensing unit associated with a seed planter which utilizes a transparent delivery tube 54. In this case, the delivery tube need not be severed, as in FIG. 1, for interposing the sensing unit. Instead, the sensing unit merely is slipped over the transparent delivery tube and secured in desired position by such means as an elastic band 56 of rubber or other appropriate material. Although the band need only be secured about the transparent tube, to form an abutment for the lower end of the sensing unit, it is preferred that the band be stretched over portion of both the feed tube and sensing unit body so as to prevent vertical displacement of the latter relative to the feed tube as the planter equipment jostles along over the rough terrain of the planting area.

Figure 5:
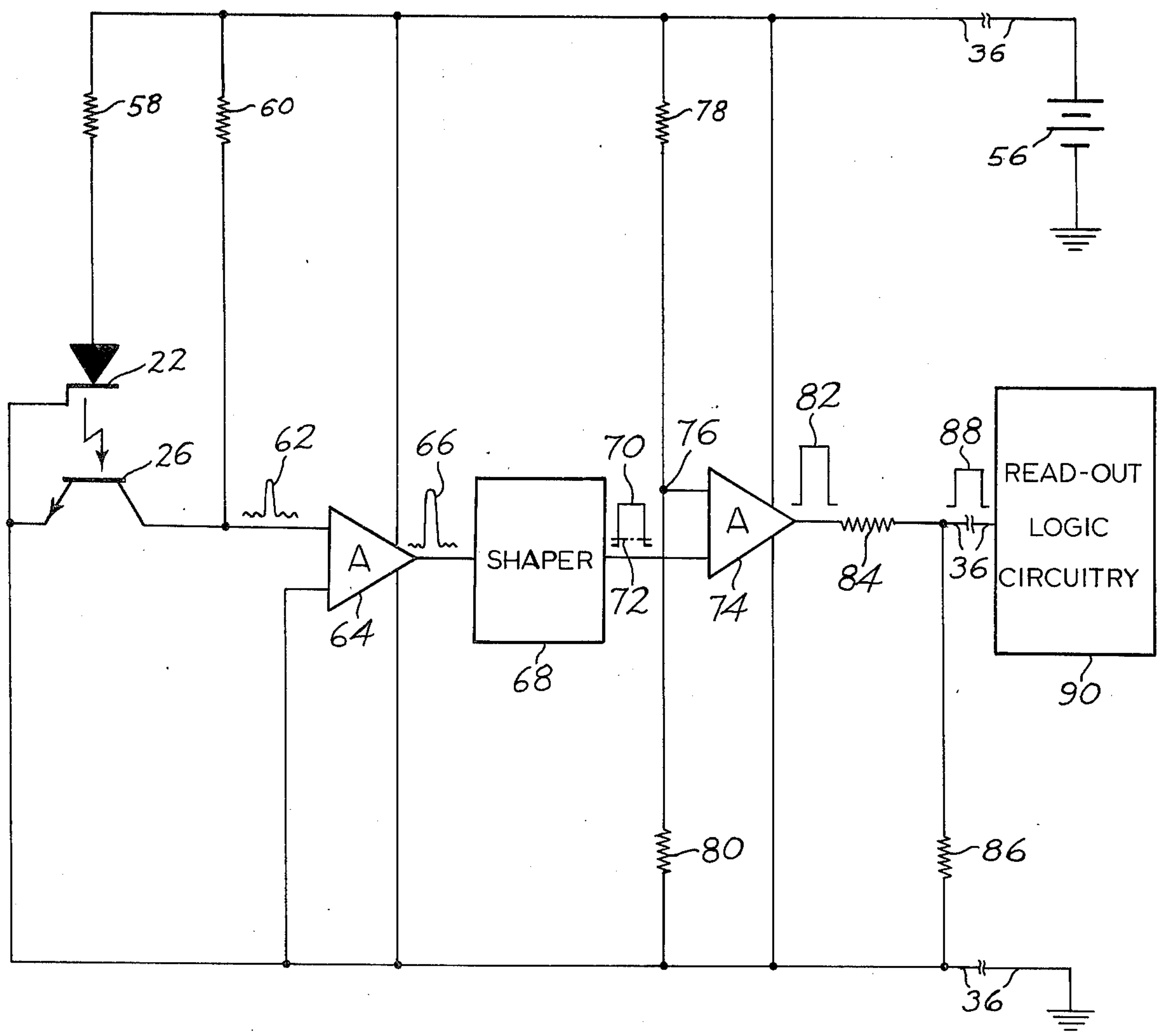
FIG. 5 is a schematic electrical diagram of an electronic counting circuit for association with the particle counting apparatus of the preceding views.

Referring now to FIG. 5 of the drawings, there is illustrated a conventional electronic signal processing and counter circuit. A battery 56 provides operating potential for the infrared emitting diode 22, the current therefor being set and limited by the resistor 58. The level of current determines the level of intensity of the infrared field which, in turn, determines in part the sensitivity of the fiber optic system to the passage of small particles.

The infrared energy emitted by the diode 22 is directed along the multiplicity of optical fibers 24 and is projected in a substantially coherent beam transversely across the passageway defined by wall 18 as a field of radiation of substantially exceeding the minimum thickness of particles to be counted.

The infrared radiation beamed across the passageway is received through the optical fibers and impressed upon the infrared phototransistor 26. The phototransistor conducts current proportional to the level of illumination impressed upon it, and the collector current flowing through the resistor 60 establishes the level of collector voltage for the photo-transistor.

When a particle to be counted is dropped through the passageway, and hence through the field of infrared radiation, it causes a momentary change in intensity of said radiation field. This decrease in field intensity results in a decrease in current through the phototransistor and a corresponding decrease in the voltage across the resistor 60. The resulting pulse 62 appearing at the collector of the phototransistor is amplified by the amplifier 64. The amplified pulse 66 from the amplifier is shaped by the shaper 68 and appears as a square wave pulse 70 having a base below a reference voltage 72 and an amplitude above said reference voltage.

A digital comparator 74 operates in such manner that when the voltage level output from the shaper is lower than the reference voltage at the junction 76 of resistors 78 and 80, the output of the comparator is, for example, near zero volts. However, when the voltage level output from the shaper is higher than the reference voltage at said junction, the output voltage from the comparator is, for example, about ten volts.

Accordingly, when the output of the shaper is the square wave pulse 70 illustrated, with its base lower than the reference level 72 and the top higher than the reference level, the output of the comparator 74 is a ten volt square wave pulse 82 with a duration proportional to the time that the particle has interrupted the infrared beam.

The voltage divider resistors 84 and 86 provide the necessary attenuation and line impedance matching to convert the output waveform 82 from the comparator to the attenuated waveform 88 illustrated and to transmit it to the read-out logic circuitry 90.

In the seed planting illustration, the read-out circuitry is located in a console located in the pulling tractor, in a position for convenient viewing by the operator. The read-out circuitry processes the input pulses 88 as required, for example to determine the presence, number, feed rate, size, or other information relative to the particles, as desired. The circuitry preferably includes a visual digital read-out of conventional form.

Figure 2:
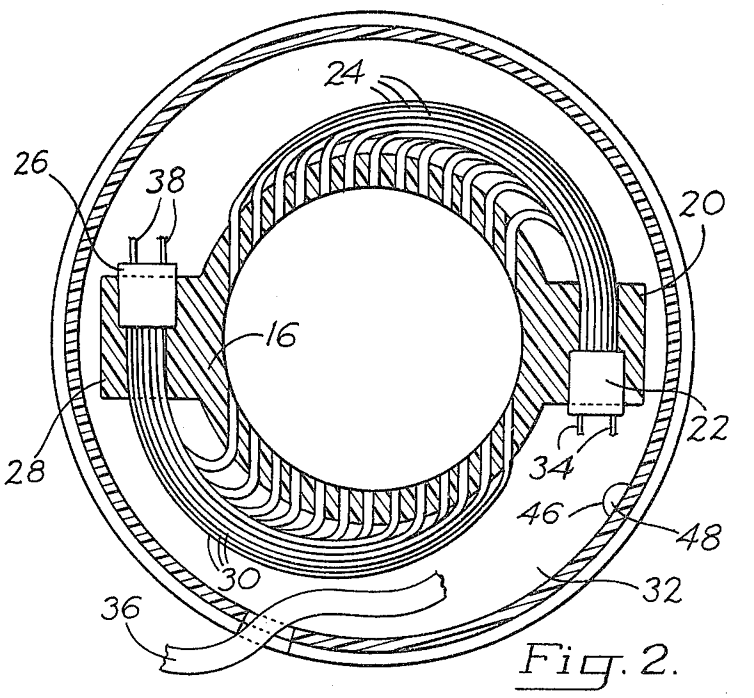
FIG. 2 is a transverse sectional view taken on the line 2—2 in FIG. 1.
Figure 3:
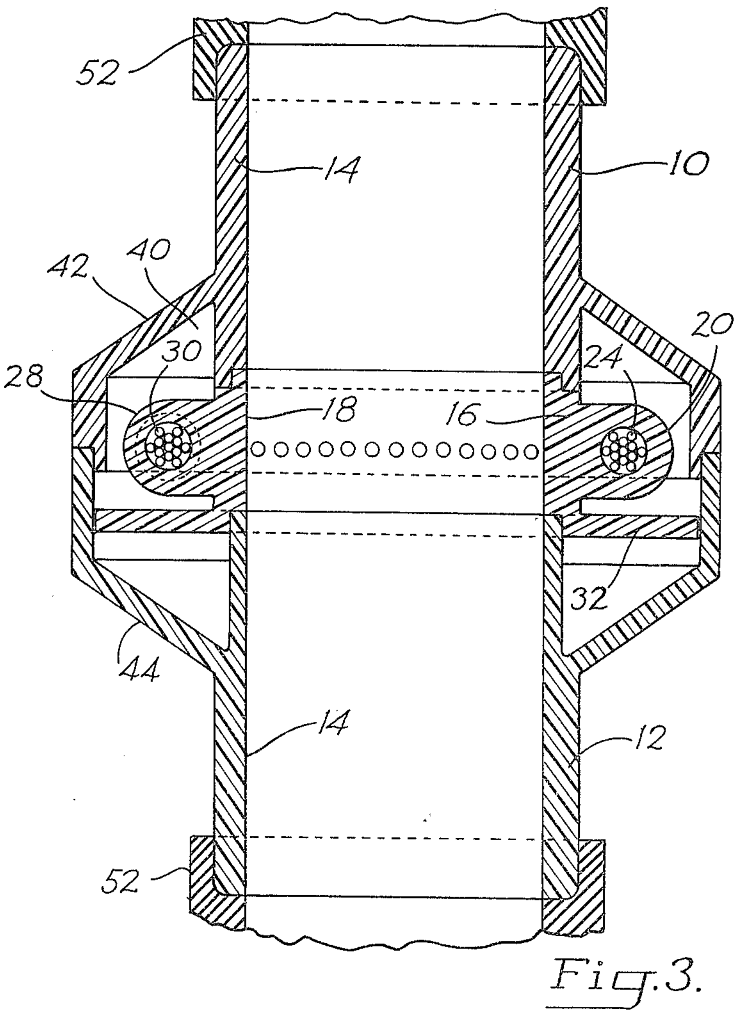
FIG. 3 is a fragmentary longitudinal section taken on the line 3—3 in FIG. 1.

In a practical application to seed planting, the passageway through the hollow body 16 of the sensing unit is about 2.5 centimeters in diameter; the optical fibers are about 0.75 mm. in diameter and the spacing between adjacent fibers is about 0.7 mm. Thus, FIGS. 1 and 4 of the drawings illustrate the unit in substantially full scale, while FIGS. 2 and 3 are about twice scale. The illustrated arrangement accommodates the counting of seeds ranging in size from as small as celery seeds to as large as chunks of potato.

Typical commercially available components for the circuitry illustrated in FIG. 5, are the following, it being understood that other equivalent components also are available from a variety of commercial sources: The light emitting diode 22 may be model TIL 31 of Texas Instruments; the phototransistor 26 may be Model TIL 81 of Texas Instruments; the amplifier 64 may be one-half of model LM 358 of Texas Instruments and the comparator 74 may be the other half thereof. The shaping network 68 may be of any conventional form, many of which are well known in the art. The read-out logic circuitry may be anyone of a number of conventional counter circuits presently associated with a conventional visual digital read-out system. It will be understood that the counter system is chosen to provide the desired read-out information. Thus, for example, when the apparatus is to be used for counting seeds as they are planted, the read-out logic circuitry preferably is chosen to identify the number of seeds planted per unit of row length. It may be chosen to indicate the number or weight of seeds per unit of area, for example pounds per acre. In applications other than seed planting, the read-out logic circuitry may be chosen merely to count the number of articles per unit of time, or merely to give indication of continuing presence of articles being counted.

The radiation field may be provided by means other than the multiplicity of optical fibers illustrated. For example, the optical fibers may be replaced with a flat plate of fiber optic material having an inner edge contoured to the profile of the passageway, in the area of the optical fibers illustrated, and constructed in manner well known to those skilled in the art to allow projection of the radiation only from that inner edge and in a flat, substantially non-divering beam.

From the foregoing it will be appreciated that the present invention provides method and apparatus by which articles of diverse types and wide range of sizes may be counted with speed and precision, under adverse conditions of severe vibration and atmospheric contamination. The apparatus is versatile in its applicability to association with a wide variety of types of particle dispensing equipment, with minimum modification. The apparatus also is of simplified construction for economical manufacture, thereby making it available for a wide variety of applications.

It will be apparent to those skilled in the art that various changes may be made in the method steps and in the size, shape, type, number and arrangement of parts of the apparatus described hereinbefore without departing from the spirit of this invention.

Having now described my invention and the manner in which it may be used, I claim:

1. The method of counting particles of particulate material, comprising:
 (a) providing a flat beam of infrared or visible light radiation having a thickness not substantially exceeding the minimum thickness of particles to be counted and a width at least substantially equal to the cross sectional width of a passageway through which particles are to be passed,
 (b) projecting said flat beam of radiation flatwise transversely across substantially the entire cross sectional area of a passageway through which particles are to be passed,
 (c) detecting said beam as a field of radiation of substantially constant intensity,
 (d) passing particles to be counted through said passageway and said flat field of radiation,
 (e) detecting the change in intensity of said field of radiation resulting from the passage of each particle through said field, and
 (f) utilizing said detected change in intensity to actuate an electronic counter to count said particle.

2. Apparatus for counting particles of particulate material, comprising:
 (a) a hollow body having a longitudinal passageway therethrough for passage of particles to be counted,
 (b) a source of infrared or visible light radiation communicating with the passageway in the body and arranged to provide a flat beam of said radiation projecting flatwise across substantially the entire cross sectional area of said passageway as a field of substantially constant intensity and having a thickness not substantially exceeding the minimum thickness of particles to be counted and a width at least substantially equal to the cross sectional width of the passageway,
 (c) radiation detector means communicating with the passageway in the body and arranged to detect the intensity of said beam of radiation, and
 (d) electronic counter means connected to the detector means and operable upon the detection of a change in intensity of said beam of radiation resulting from the passage of a particle through said field, to count said particle.

3. Apparatus for counting particles of particulate material, comprising:
 (a) a hollow body having a longitudinal passageway therethrough for passage of particles to be counted,
 (b) a source of infrared or visible light radiation communicating with the passageway in the body and arranged to provide a flat beam of said radiation projecting flatwise across substantially the entire cross sectional area of said passageway as a field of substantially constant intensity and having a thickness not substantially exceeding the minimum thickness of particles to be counted and a width at least substantially equal to the cross sectional width of the passageway,
 (c) radiation detector means communicating with the passageway in the body and arranged to detect the intensity of said beam of radiation,
 (d) the source of radiation and the detector means each including a plurality of optical fibers having one of their ends communicating with said passageway, said one ends having diameters and lateral spacings between them not substantially exceeding the minimum thickness of particles to be counted,
 (e) the said one ends of the fibers associated with the source of radiation being arranged in the body to face the said one ends of the fibers associated with the detector means across said passageway,
 (f) said fibers being characterized by producing a beam of radiation the thickness of which is substantially constant across said passageway, and
 (g) electronic counter means connected to the detector means and operable upon the detection of a change in intensity of said beam of radiation resulting from the passage of a particle through said field, to count said particle.

4. Apparatus for counting particles of particulate material, comprising:
 (a) a hollow body having a longitudinal passageway therethrough for passage of particles to be counted, the hollow body comprising a pair of axially aligned tubular sections defining portions of said passageway, a hollow ring interposed between and joining said tubular sections to complete said passageway, and support means extending outwardly from said ring for supporting components of a radiation source and radiation detector means,
 (b) a source of infrared or visible light radiation supported on the support means and communicating with the passageway in the body and arranged to provide a flat beam of said radiation projecting flatwise across substantially the entire cross sectional area of said passageway as a field of substantially constant intensity and having a thickness not substantially exceeding the minimum thickness of particles to be counted and a width at least substantially equal to the cross sectional width of the passageway,
 (c) radiation detector means supported on the support means and communicating with the passageway in the body and arranged to detect the intensity of said beam of radiation, and
 (d) electronic counter means connected to the detector means and operable upon the detection of a change in intensity of said beam of radiation resulting from the passage of a particle through said field, to count said particle.

5. The apparatus of claim 4 including an outer peripheral wall extending outwardly from said tubular sections for mutual engagement when the ring joins said tubular sections together, forming a closed peripheral chamber confining therein said support means and components of said radiation source and detector means.

6. Apparatus for counting particles of particulate material, wherein the particles to be counted are dropped by gravity through an elongated tube, the apparatus comprising:

(a) a hollow body having a longitudinal passageway therethrough for passage of particles to be counted, the elongated tube through which the particles are to be dropped by gravity being severed intermediate its ends and the hollow body interposed between said severed ends, (b) a source of infrared or visible light radiation communicating with the passageway in the body and arranged to provide a flat beam of said radiation projecting flatwise across substantially the entire cross sectional area of said passageway as a field of substantially constant intensity and having a thickness not substantially exceeding the minimum thickness of particles to be counted and a width at least substantially equal to the cross sectional width of the passageway, (c) radiation detector means communicating with the passageway in the body and arranged to detect the intensity of said beam of radiation, and (d) electronic counter means connected to the detector means and operable upon the detection of a change in intensity of said beam of radiation resulting from the passage of a particle through said field, to count said particle.

7. Apparatus for counting particles of particulate material wherein the particles to be counted are dropped by gravity through a transparent tube, the apparatus comprising:

(a) a hollow body having a longitudinal passageway therethrough for passage of particles to be counted, the transparent tube extending through the passageway in the hollow body, and securing means interengaging the tube and body for securing the latter in desired position on the tube, (b) a source of infrared or visible light radiation communicating with the passageway in the body and arranged to provide a flat beam of said radiation projecting flatwise across substantially the entire cross sectional area of said passageway as a field of substantially constant intensity and having a thickness not substantially exceeding the minimum thickness of particles to be counted and a width at least substantially equal to the cross sectional width of the passageway, (c) radiation detector means communicating with the passageway in the body and arranged to detect the intensity of said beam of radiation, and (d) electronic counter means connected to the detector means and operable upon the detection of a change in intensity of said beam of radiation resulting from the passage of a particle through said field, to count said particle.

8. The apparatus of claim 7 wherein the securing means comprises an elastic band frictionally interengaging the transparent tube and hollow body.

* * * * *